June 11, 1963 R. E. HENNEN ET AL 3,093,516
HYDROMETER VENT CAP
Filed April 25, 1961

INVENTORS
ROY E. HENNEN
JEROME T. LAWRIE
BY
*John W. Michael*
ATTORNEY

United States Patent Office 3,093,516
Patented June 11, 1963

3,093,516
HYDROMETER VENT CAP
Roy E. Hennen, Mequon, and Jerome T. Lawrie, Brookfield, Wis., assignors to Globe-Union Inc., Milwaukee, Wis., a corporation of Delaware
Filed Apr. 25, 1961, Ser. No. 105,376
6 Claims. (Cl. 136—177)

This invention relates to electric storage batteries and particularly, to a combination vent cap and hydrometer for such batteries.

The density and proper heighth of the electrolyte in electric storage batteries is only periodically tested by service station attendants to determine the charge and condition of a battery. However, for best performance of the battery, such test should be made more frequently.

The primary object of this invention, therefore, is to provide a simple and convenient means constantly attached to the battery to determine the density and proper heighth of an electrolyte in a battery without the necessity of removing the vent caps for each cell of the battery.

This object is accomplished by constructing the battery vent cap so that it has a lower threaded portion which is threaded into the vent opening of a cell of the battery and an upper transparent cylindrical portion which constitutes the gripping portion of the cap and the temporary reservoir for a plunger actuated hydrometer. A tube with a supporting annular flange is held between such lower and upper portions of the cap. This tube has a lower end which extends into the battery a sufficient distance to extend slightly below the normal electrolyte level in the battery. An imperforate plunger is slidably carried in the upper portion of the cap and has a stem extending above the cap on which a colored disc-like handle is mounted. When such handle is raised, the plunger is pulled upward in the upper part of the cap to draw electrolyte into such cylinder. A colored indicator ball is positioned within such cylinder to float in the electrolyte if the specific density is at a predetermined level. If no electrolyte or an amount insufficient to float the ball is drawn into the cylinder, this is a signal that the cell is low on electrolyte. If enough electrolyte is drawn into the cylinder to float the ball and the ball fails to float, the specific density of the electrolyte will be too low for the battery to maintain an adequate charge. Thus, with a battery having each cell equipped with this vent cap, it is not necessary to remove each vent cap from each cell and insert a hydrometer to adequately test each cell. The service man merely raises each colored disc-like handle and makes a visual inspection of each reservoir. If any cell is low in electrolyte or proper density only the vent cap for such cell need be removed for addition of electrolyte.

Another important feature of such vent cap is that upon depressing the handle all the electrolyte in the hydrometer is returned to the cell. This cannot be obtained with the squeeze bulb type of hydrometer without withdrawing the hydrometer tube from the electrolyte.

Other objects and advantages will be pointed out in, or be apparent from, the specification and claims, as will obvious modifications of the single embodiment shown in the drawings, in which:

Figure 1:
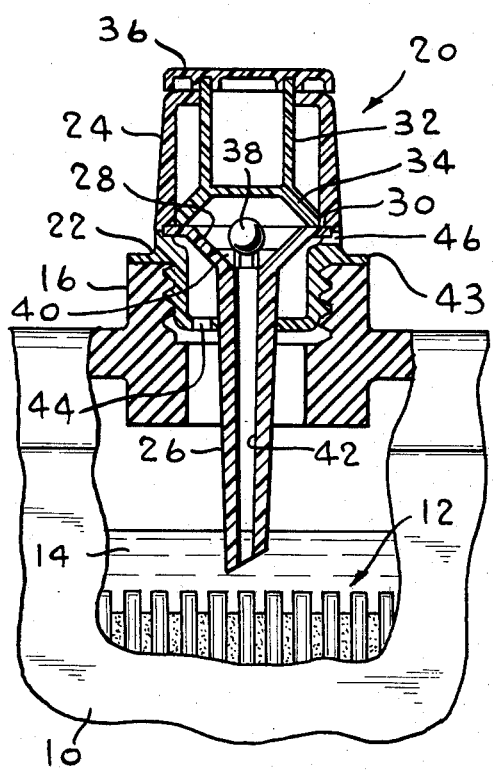
FIG. 1 is a fragmentary view of a battery partly broken away to show the hydrometer vent cap with the plunger all of the way down.
Figure 2:
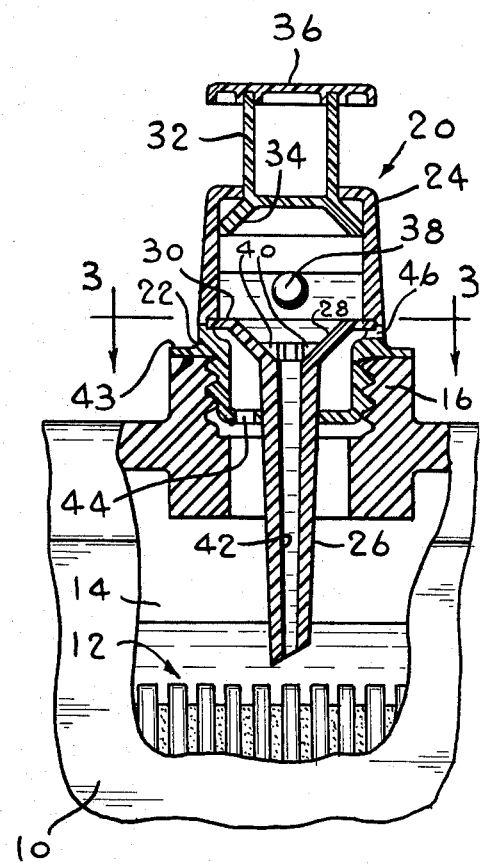
FIG. 2 is similar to FIG. 1 with the plunger all of the way up.
Figure 3:
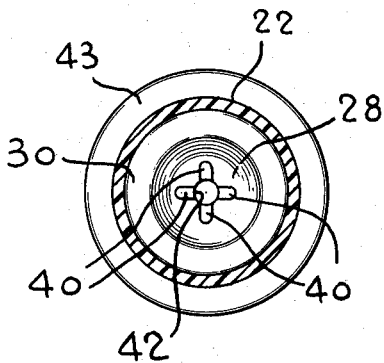
FIG. 3 is taken on line 3—3 of FIG. 1 showing the center of the conical tube.

Referring to the drawing in detail, a section of a battery 10 is shown with a number of cells 12 immersed in electrolyte 14. A conventional threaded vent cap opening 16 is provided in the top of the battery to receive a vent cap or a hydrometer type vent cap 20 as disclosed herein.

The hydrometer type vent cap has a cup shaped base 22 externally threaded for engagement in the vent cap opening and an upper transparent plastic viewing cylinder 24. The viewing cylinder is cemented to the base and projects above the upper surface of the battery to form a gripping surface for the vent cap as well as temporary reservoir for testing the battery electrolyte. A tube 26 having an upper conical section 28 is positioned within the base with the viewing cylinder sealed to an annular supporting flange 30 on the outer periphery of the conical section. The lower end of the tube is immersed in the battery electrolyte.

A clear plastic plunger 32 having a conical flange 34 engaging the inner surface of the viewing cylinder is mounted for reciprocal motion within the viewing cylinder. A colored disc 36 is cemented to the upper end of the plunger and overlies the top of the cylinder to prevent any foreign material from entering the upper portion of the viewing cylinder. An indicator ball 38 is positioned within the space between the conical portion of the plunger and the conical portion of the tube. Grooves 40 are cut in the bottom of the conical portion of the tube to allow for the free flow of electrolyte into and out of opening 42 in the tube.

The base of the vent cap is provided with a radial flange 43 which seats on the upper surface of the vent cap opening. Vents 44 and 46 are provided in the base to compensate for the normal variations in pressure which occur within the battery. This particular arrangement of vents acts as a trap to prevent the electrolyte from being splashed out of the cap when the battery is bounced by the action of the vehicle in which it is installed.

In operation, the base of the vent cap is screwed tightly into the vent cap opening with flange 43 seated on the vent cap opening. The top disc is then pulled upward raising the plunger in the cylinder. The conical flange of the plunger has sufficient engagement with the inner walls of the viewing cylinder to create a vacuum within the space between the plunger and tube. Electrolyte will rise in the tube and fill the viewing cylinder sufficiently to float the indicator ball. The ball is manufactured to rise in a liquid having a specific gravity of 1.230 or higher. At this specific gravity, the battery is considered at about "half charge." It follows that if the ball doesn't rise in the electrolyte in the viewing cylinder, the battery is at less than half charge and needs attention.

The hydrometer vent cap has been so designed that, when properly placed in a battery, the lower end of the tube will be immersed approximately one-sixteenth of an inch below the normal level of the electrolyte. If no electrolyte is drawn into the viewing cylinder when the piston is raised in the cylinder, it will be obvious that the electrolyte has fallen below a safe level in the battery and liquid should be added. The low cost of manufacture of vent caps of this type makes it possible to supply them with the battery or as a separate unit which can be attached to the battery. The car owner or gas station attendant may then make a simple and accurate test of the battery at his convenience.

Although but a single embodiment of the present invention has been illustrated and described, it will be apparent to those skilled in the art that various changes and modifications may be made therein without departing from the spirit of the invention or from the scope of the appended claims.

We claim:
1. A vent cap for the vent opening of the cell of an electric storage battery having liquid electrolyte therein to be maintained at a normal level having
 a portion sealingly engageable with said vent opening and adapted to hold said vent cap in place in said vent opening and prevent loss of electrolyte therebetween,
 a vent with an opening below and above said portion to provide means for venting the cell and preventing abnormal accumulation of pressure therein,
 a transparent reservoir above said portion adapted to temporarily receive electrolyte from the cell,
 a tube with an upwardly opening conical portion connected to said reservoir and a lower end constituting an inlet to be positioned below the normal level for the electrolyte in the cell,
 an imperforate plunger operable within said reservoir having a downwardly facing conical portion opening toward said tube and provided with manually engageable means extending exteriorly of said reservoir for raising and lowering said plunger to draw electrolyte from the cell into said reservoir and expel it from said reservoir back into the cell without removing the vent cap from its proper position in said vent opening, and
 specific gravity indicating means within said transparent reservoir cooperable with liquid drawn into said reservoir to indicate whether the specific density is above or below normal.

2. A vent cap according to claim 1 wherein said indicating means comprises a ball which is stored on the internal apex of the conical portion of said tube and said apex includes a number of grooves to allow for the free flow of liquid into and out of said viewing chamber.

3. A vent cap according to claim 2 wherein said tube has its lower end extending into said battery a predetermined distance to indicate the absence of sufficient liquid in the battery when the plunger is pulled away from the tube.

4. A vent cap for a liquid electric storage battery having a number of threaded openings therein comprising, a cup shaped base externally threaded for engagement with one of said openings, a tube having an upper conical portion with an annular supporting flange positioned within said base with said flange flush with the upper surface of said base and a lower portion for immersion in the liquid of said battery, said base having an air vent path around said tube, a transparent plastic viewing cylinder secured to said base in sealing engagement with said supporting flange, plunger means sealingly engaging the inner surface of said cylinder and supported for reciprocal motion therein, and indicating means supported by the conical portion of said tube for showing the specific gravity of the liquid drawn into the cylinder by the motion of said plunger means.

5. A vent cap according to claim 4 wherein said plunger includes an imperforate downwardly opening conical portion positioned opposite to said conical portion of said tube for defining a storage space for said indicating means, the outer periphery of the conical portion of the plunger means engaging the inner surface of said viewing cylinder to create a vacuum in the cylinder when the plunger means is moved away from the tube.

6. A vent cap according to claim 5 including a colored plastic disc secured to said plunger means exteriorly of said cylinder and defining a top for the viewing cylinder when the plunger means is in an operative position.

References Cited in the file of this patent
UNITED STATES PATENTS
2,093,669  Forster _____ Sept. 21, 1937